United States Patent
Ke et al.

(10) Patent No.: US 10,498,582 B2
(45) Date of Patent: *Dec. 3, 2019

(54) RELATED CONTENT DISPLAY ASSOCIATED WITH BROWSING

(71) Applicant: Microsoft Technology Licensing, LLC, Redmond, WA (US)

(72) Inventors: Yan Ke, Redmond, WA (US); Serge Smirnov, Redmond, WA (US); Qiaolin Mao, Kirkland, WA (US); Alexander Owen Coll, Cracow (PL); Ting Cai, Redmond, WA (US); Xiaodong Fan, Sammamish, WA (US); Junaid Ahmed, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,875

(22) Filed: May 30, 2017

(65) Prior Publication Data

US 2017/0272303 A1 Sep. 21, 2017

Related U.S. Application Data

(63) Continuation of application No. 13/917,977, filed on Jun. 14, 2013, now Pat. No. 9,699,019.

(51) Int. Cl.
*H04L 12/24* (2006.01)
*G06F 16/335* (2019.01)
(Continued)

(52) U.S. Cl.
CPC ........ *H04L 41/0246* (2013.01); *G06F 16/335* (2019.01); *G06F 16/337* (2019.01);
(Continued)

(58) Field of Classification Search
CPC ......... G06F 17/30699; G06F 17/30702; G06F 17/30867; H04L 67/306; H04L 67/02; H04L 67/22; H04L 67/30; H04L 65/4084
See application file for complete search history.

(56) References Cited

U.S. PATENT DOCUMENTS

| 6,370,513 | B1 | 4/2002 | Kolawa et al. |
| 7,783,622 | B1 * | 8/2010 | Vandermolen ........ G06F 3/0481 707/708 |

(Continued)

FOREIGN PATENT DOCUMENTS

| CN | 1432909 A | 7/2003 |
| CN | 101777081 A | 7/2010 |

(Continued)

OTHER PUBLICATIONS

European Communication in Application 13726629.2, dated Dec. 18, 2014, 2 pages.

(Continued)

*Primary Examiner* — David R Lazaro

(57) ABSTRACT

One or more techniques and/or systems are provided for displaying related content associated with browsing a website. For example, a user may access a website to view content provided by the website. As opposed to the user manually searching for interesting content through trial and error, related content that may be interesting to the user may be identified and surfaced to the user. For example, a user profile specifying user interests of the user may be used to identify related content assigned topics corresponding to the user interests (e.g., content provided by the website or other web source). In this way, the related content may be displayed to the user through a content recommendation reader interface. In an example, the content recommendation reader interface may be provided by a web browser so that related (Continued)

content may be identified and/or provided to users of any website from any device.

20 Claims, 10 Drawing Sheets

(51) Int. Cl.
*G06F 16/9535* (2019.01)
*H04L 29/08* (2006.01)
(52) U.S. Cl.
CPC .......... *G06F 16/9535* (2019.01); *H04L 67/02* (2013.01); *H04L 67/306* (2013.01); *H04L 67/22* (2013.01)

(56) References Cited

U.S. PATENT DOCUMENTS

| | | | |
|---|---|---|---|
| 7,864,163 B2 | 1/2011 | Ording et al. | |
| 8,169,410 B2 | 5/2012 | Hashimoto et al. | |
| 8,244,740 B2* | 8/2012 | Gruenhagen | G06F 16/337 707/751 |
| 8,260,938 B2 | 9/2012 | Gupta et al. | |
| 8,275,674 B2* | 9/2012 | Kane, Jr. | G06Q 30/02 705/27.1 |
| 8,296,392 B2 | 10/2012 | Green et al. | |
| 8,321,278 B2* | 11/2012 | Haveliwala | G06F 16/9535 705/14.66 |
| 8,504,583 B1 | 8/2013 | Ke et al. | |
| 8,732,569 B2* | 5/2014 | Burkard | G06F 17/2235 715/206 |
| 8,977,967 B2 | 3/2015 | Kim et al. | |
| 9,009,258 B2 | 4/2015 | Ramachandran et al. | |
| 9,058,396 B2 | 6/2015 | Kim et al. | |
| 9,201,964 B2 | 12/2015 | Zhiyanov et al. | |
| 9,699,019 B2* | 7/2017 | Ke | H04L 41/0246 |
| 2002/0010625 A1 | 1/2002 | Smith et al. | |
| 2002/0019763 A1 | 2/2002 | Linden et al. | |
| 2002/0198882 A1 | 12/2002 | Linden et al. | |
| 2003/0163399 A1 | 8/2003 | Harper et al. | |
| 2003/0195884 A1* | 10/2003 | Boyd | G06F 16/9535 |
| 2005/0193002 A1 | 9/2005 | Souders et al. | |
| 2006/0059152 A1 | 3/2006 | Nakamura et al. | |
| 2006/0059225 A1 | 3/2006 | Stonehocker et al. | |
| 2006/0069618 A1 | 3/2006 | Milener et al. | |
| 2006/0085766 A1 | 4/2006 | Dominowska et al. | |
| 2008/0126176 A1 | 5/2008 | Iguchi | |
| 2008/0250026 A1 | 10/2008 | Linden et al. | |
| 2008/0295018 A1 | 11/2008 | Nurmi et al. | |
| 2008/0306908 A1 | 12/2008 | Agrawal et al. | |
| 2009/0030792 A1* | 1/2009 | Khivesara | G06Q 30/0253 705/14.51 |
| 2009/0100469 A1* | 4/2009 | Conradt | H04N 7/17318 725/46 |
| 2009/0244020 A1 | 10/2009 | Sjolin | |
| 2010/0121777 A1 | 5/2010 | McGonigal et al. | |
| 2010/0131441 A1 | 5/2010 | Gruenhagen et al. | |
| 2010/0153324 A1 | 6/2010 | Downs et al. | |
| 2010/0250341 A1* | 9/2010 | Hauser | G06Q 30/02 707/769 |
| 2010/0262780 A1 | 10/2010 | Mahan et al. | |
| 2010/0293179 A1 | 11/2010 | Chaudhuri et al. | |
| 2010/0332962 A1 | 12/2010 | Hammer et al. | |
| 2011/0029516 A1 | 2/2011 | Chang et al. | |
| 2011/0035402 A1 | 2/2011 | Agrawal et al. | |
| 2011/0035663 A1 | 2/2011 | Moon et al. | |
| 2011/0119139 A1 | 5/2011 | Dean et al. | |
| 2011/0173216 A1 | 7/2011 | Newman et al. | |
| 2011/0208730 A1 | 8/2011 | Jiang et al. | |
| 2011/0246291 A1 | 10/2011 | Paul | |
| 2011/0282856 A1 | 11/2011 | Ganti et al. | |
| 2012/0005192 A1 | 1/2012 | Bao et al. | |
| 2012/0011095 A1 | 1/2012 | Ahrens et al. | |
| 2012/0089621 A1* | 4/2012 | Liu | G06F 16/335 707/749 |
| 2012/0151308 A1 | 6/2012 | Falkenberg et al. | |
| 2012/0167017 A1 | 6/2012 | Oh | |
| 2012/0173324 A1 | 7/2012 | Vallery et al. | |
| 2012/0221932 A1 | 8/2012 | Gleadall et al. | |
| 2012/0284597 A1 | 11/2012 | Burkard et al. | |
| 2012/0291072 A1* | 11/2012 | Maddison | H04N 21/4524 725/53 |
| 2013/0024757 A1 | 1/2013 | Doll et al. | |
| 2013/0238745 A1 | 9/2013 | Ramachandran et al. | |
| 2013/0305136 A1 | 11/2013 | Kim | |
| 2013/0305159 A1 | 11/2013 | Kim | |
| 2013/0346197 A1 | 12/2013 | Zhou et al. | |
| 2014/0059156 A1* | 2/2014 | Freeman, II | H04L 67/10 709/213 |
| 2014/0280214 A1* | 9/2014 | Han | G06F 16/90 707/748 |
| 2014/0372563 A1* | 12/2014 | Ke | H04L 41/0246 709/218 |
| 2017/0039272 A1* | 2/2017 | Roseman | G06F 17/278 |
| 2017/0272303 A1* | 9/2017 | Ke | H04L 41/0246 |

FOREIGN PATENT DOCUMENTS

| | | |
|---|---|---|
| CN | 102314436 A | 1/2012 |
| CN | 102314450 A | 1/2012 |
| CN | 102314474 A | 1/2012 |
| CN | 103635896 A | 3/2014 |
| WO | 2010144201 | 12/2010 |

OTHER PUBLICATIONS

European Office Action in Application 14736190.1, dated Mar. 28, 2017, 11 pages.
Features on Android, Retrieved at <<http://dolphin-browser.com/features/>>, Retrieved at: Jul. 12, 2012, pp. 4.
Flip Ahead Browsing, Retrieved on: Mar. 22, 2013, pp. 4, Available at: http://msdn.microsoft.com/en-in/library/ ie/jj883726(v=vs.85). aspx#enablingflipahead.
Flipboard, Retrieved on: Apr. 1, 2013, pp. 3, Available at: http://en.wikipedia.org/wiki/Flipboard.
Gray, Joel, "Steel Android Web Browser", Retrieved at <<http://www.androidtapp.com/steel-android-web-browser/>>, May 2, 2009, pp. 6.
Opera Reader: Paging the Web, Retrieved on: Apr. 1, 2013, pp. 8, Available at: http://people.opera.com/howcome/2011/reader/.
PCT 2nd Written Opinion for PCT Application No. PCT/US2014/041609, dated Apr. 22, 2015, 8 pages.
PCT International Search Report & Written Opinion for PCT Application No. PCT/US2014/041609, dated Oct. 27, 2014, 10 Pages.
PCT International Search Report, dated Jul. 19, 2013, Application No. PCT/US2013/040680, Filed Date: May 11, 2013, pp. 9.
Pulse, Retrieved on: Apr. 1, 2013, pp. 3, Available at: https://play.google.com/store/apps/details?id=com. alphonso.pulse&hl=en.
U.S. Appl. No. 13/396,056, Amendment and Response filed Jan. 16, 2013, 17 pages.
U.S. Appl. No. 13/396,056, Notice of Allowance dated Apr. 22, 2013, 15 pages.
U.S. Appl. No. 13/396,056, Office Action dated Oct. 16, 2012, 10 pages.
U.S. Appl. No. 13/558,704, Amendment and Response filed Oct. 3, 2014, 13 pages.
U.S. Appl. No. 13/558,704, Amendment and Response filed Dec. 6, 2013, 13 pages.
U.S. Appl. No. 13/558,704, Amendment and Response filed Mar. 19, 2014, 14 pages.
U.S. Appl. No. 13/558,704, Amendment and Response filed Jun. 4, 2013, 14 pages.
U.S. Appl. No. 13/558,704, Notice of Allowance dated Oct. 24, 2014, 7 pages.
U.S. Appl. No. 13/558,704, Notice of Allowance dated Nov. 20, 2014, 2 pages.
U.S. Appl. No. 13/558,704, Office Action dated Jan. 17, 2013, 15 pages.

(56) References Cited

OTHER PUBLICATIONS

U.S. Appl. No. 13/558,704, Office Action dated Dec. 20, 2013, 24 pages.
U.S. Appl. No. 13/558,704, Office Action dated Jun. 21, 2013, 21 pages.
U.S. Appl. No. 13/558,704, Office Action dated Jul. 31, 2014, 24 pages.
U.S. Appl. No. 13/653,294, Amendment and Response filed Jan. 13, 2015, 11 pages.
U.S. Appl. No. 13/653,294, Amendment and Response filed Mar. 15, 2013, 14 pages.
U.S. Appl. No. 13/653,294, Amendment and Response filed Apr. 21, 2014, 13 pages.
U.S. Appl. No. 13/653,294, Amendment and Response filed Sep. 23, 2013, 15 pages.
U.S. Appl. No. 13/653,294, Notice of Allowance dated Feb. 11, 2015, 7 pages.
U.S. Appl. No. 13/653,294, Notice of Allowance dated Apr. 9, 2015, 2 pages.
U.S. Appl. No. 13/653,294, Notice of Allowance dated May 20, 2015, 2 pages.
U.S. Appl. No. 13/653,294, Office Action dated Jan. 16, 2013, 15 pages.
U.S. Appl. No. 13/653,294, Office Action dated Dec. 23, 2013, 24 pages.
U.S. Appl. No. 13/653,294, Office Action dated Jun. 24, 2013, 21 pages.
U.S. Appl. No. 13/653,294, Office Action dated Jul. 31, 2014, 20 pages.
U.S. Appl. No. 13/917,977, Advisory Action dated Feb. 1, 2017, 3 pages.
U.S. Appl. No. 13/917,977, Amendment and Response filed Jan. 18, 2017, 15 pages.
U.S. Appl. No. 13/917,977, Amendment and Response filed Nov. 23, 2015, 15 pages.
U.S. Appl. No. 13/917,977, Amendment and Response filed Aug. 12, 2016, 15 pages.
U.S. Appl. No. 13/917,977, Notice of Allowance dated Mar. 6, 2017, 7 pages.
U.S. Appl. No. 13/917,977, Office Action dated Jul. 22, 2015, 23 pages.
U.S. Appl. No. 13/917,977, Office Action dated Apr. 12, 2016, 31 pages.
U.S. Appl. No. 13/917,977, Office Action dated Nov. 18, 2016, 30 pages.
Web Developer's Guide to Prerendering in Chrome, Retrieved on: Apr. 1, 2013, pp. 3, Available at: https://developers.google.com/chrome/whitepapers/prerender.
Zite, Retrieved on: Apr. 1, 2013, pp. 3, Available at: http://zite.com/.
"First Office Action and Search Report Issued in Chinese Patent Application No. 201480033854.8", dated Feb. 12, 2018, 14 Pages.
"Office Action Issued in European Patent Application No. 13726629.2", dated May 11, 2018, 8 Pages.
"First Office Action and Search Report Issued in Chinese Patent Application No. 201380024624.0", dated Jan. 11, 2017, 25 Pages.
"Second Office Action Issued in Chinese Patent Application No. 201380024624.0", dated Jun. 12, 2017, 25 Pages.
"Third Office Action and Search Report Issued in Chinese Patent Application No. 201380024624.0", dated Aug. 14, 2017, 29 Pages.
"Second Office Action Issued in Chinese Patent Application No. 201480033854.8", dated Nov. 2, 2018, 13 Pages.
Balabanovic, Marko, "An Adaptive Web Page Recommendation Service", In Proceedings of the First International Conference on Autonomous Agents, Feb. 5, 1997, 9 Pages.
Cantador, et al., "Enriching Ontological User Profiles with Tagging History for Multi-Domain Recommendations", In Proceedings of the 1st International Workshop on Collective Semantics: Collective Intelligence and the Semantic Web, Jun. 2008, 15 Pages.
Neumann, Andreas W., "Recommender Systems for Scientific and Technical Information Providers", In Dissertation, University Karlsruhe, Jan. 31, 2008, 158 Pages.
Niwa, et al., "Web Page Recommender System based on Folksonomy Mining for ITNG '06 Submissions", In Proceedings of the Third International Conference on Information Technology: New Generations, Apr. 10, 2006, 6 Pages.
Zhu, et al., "StatSnowball: a Statistical Approach to Extracting Entity Relationships", In Proceedings of 18th International Conference on World Wide Web, Apr. 20, 2009, pp. 101-110.
"Office Action Issued in Chinese Patent Application No. 201480033854.8", dated Mar. 21, 2019, 9 Pages.

* cited by examiner

RELATED CONTENT DISPLAY ASSOCIATED WITH BROWSING

CROSS-REFERENCE TO RELATED APPLICATIONS

This application is a continuation application and claims priority to U.S. patent application Ser. No. 13/917,977, filed Jun. 14, 2013, entitled "RELATED CONTENT DISPLAY ASSOCIATED WITH BROWSING," now issued U.S. Pat. No. 9,699,019, which application is incorporated herein by reference in its entirety.

BACKGROUND

Many users discover, explore, and/or interact with content provided by web sources, such as websites. For example, a news website may provide articles, images, videos, and/or other content related to a variety of topics such as sports, entertainment, local news, national news, technology, etc. Because web sources may provide a vast amount of content over time, the user may be left to sift through such content to locate content that may be interesting to the user. For example, the user may manually explore or search the news website to find technology articles regarding speaker systems that the user may be researching.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for displaying related content associated with browsing a website are provided herein. For example, a user profile may be maintained for a user. The user profile may specify one or more user interests of the user based upon various information about the user (e.g., previously performed queries, previously viewed content, a social network profile, etc.). When the user browses a website, the user profile may be used to identify related content (e.g., images, articles, web pages, documents, music, videos, and/or other content provided by the website or other web sources) that may be interesting to the user.

In an example, a content recommendation request may be received from a client device accessing a website, such as a news website. The content recommendation request may specify a client identifier (e.g., an identifier for a user of the client device) and/or a website identifier (e.g., a URL or other identifier of the news website). A user interface profile for the user of the client device may be identified based upon the client identifier. Related content for the website may be identified based upon the website identifier (e.g., used to identify content, such as web pages, image, articles, documents, and/or other content provided by the website) and/or based upon the related content comprising one or more topics corresponding to one or more user interests specified within the user interface profile above an interest threshold. For example, the user interest profile may specify that the user has an interest in cooking pizza. The news website may provide a pizza article (e.g., related content) that was assigned a cooking topic and a pizza topic. The pizza article may be identified as related content based upon the cooking topic and the pizza topic corresponding to the user interest in cooking pizza above an interest threshold (e.g., a 65% correlation between the topics and the user interest).

One or more related content references, referencing the related content, may be provided to the client device for display. In an example, the website and/or other web sources may provided related content (e.g., the pizza article, an cheese image provided by a photo sharing service, a pizza shop social network page from a social network, etc.), and a related content reference may reference the related content (e.g., an identifier such as a pizza URL for the pizza article, a social network ID for the pizza shop, etc.). In another example, the related content reference may comprise the related content (e.g., a related content reference to a pizza image may comprise the pizza image). Because the related content may be identified, referenced, and/or provided to the client device from a source that is external to the website, such as a search engine, related content may be provided for any website regardless of whether a website is capable of providing personalized content to a user. In an example of providing the one or more related content references, the pizza URL for the pizza article and/or other related content references may be provided to a web browser accessing the website. The web browser may host a content recommendation reader interface through which the web browser may display related content referenced by the one or more related content references. In an example, the content recommendation reader interface may be hosted by the web browser and not the website, thus allowing for related content to be displayed for any website. In an example, the content recommendation reader interface may display related content according to a magazine reader layout (e.g., an arrangement of one or more portions of related content per magazine page) where the user may navigate between (e.g., "flip through") one or more portions of related content referenced by the related content references (e.g., the user may view the pizza article through a first page of the content recommendation reader interface, and then may navigate to a second page comprising a cheese picture, a franchise article, and a pizza delivery article arranged on the second page according to a magazine layout). In this way, personalized content may be provided through the content recommendation reader interface to a user browsing a website.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
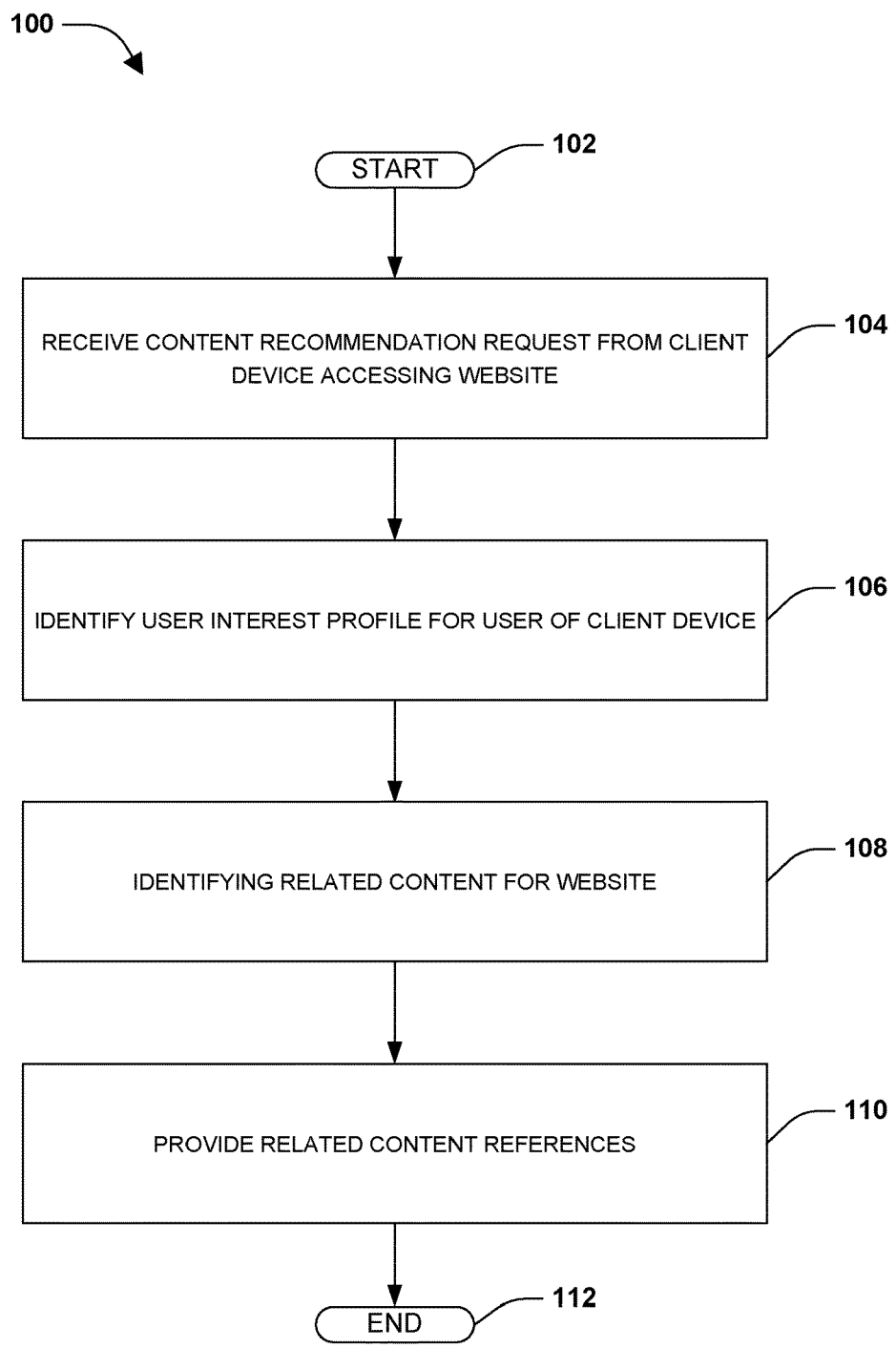
FIG. 1 is a flow diagram illustrating an exemplary method of displaying related content associated with browsing a website.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of displaying related content associated with browsing a website is illustrated by an exemplary method 100 of FIG. 1. At 102, the method starts. In an example, a client device may comprise a web browser. The web browser may be configured to access one or more websites, such as a news website, a shopping website, and/or other websites. As provided herein, a user may be aided in discovering and/or viewing personalized content (e.g., related content that may be interesting to the user) from a website and/or other web sources so that the user may efficiently access such content without undue searching and/or navigation of the website. Because related content may be identified, referenced, and/or provided by a source external to the website (e.g., a search engine may identify related content, which may be displayed to a user through a content recommendation reader interface hosted by the web browser and not the web page), related content may be provided for any website, or virtually any website, regardless of whether the website is capable of providing personalized content to users and/or regardless of what device a user may be using.

At 104, a content recommendation request may be received from the client device (e.g., a tablet, a mobile device, a personal computer, etc.). For example, the content recommendation request may be received (e.g., by a content recommendation component associated with a search engine) from a web browser hosted by the client device. The content recommendation request may specify a client identifier (e.g., identifying the client device or a user of the client device) and/or a website identifier (e.g., identifying the website that is being accessed by the client device).

Figure 3:
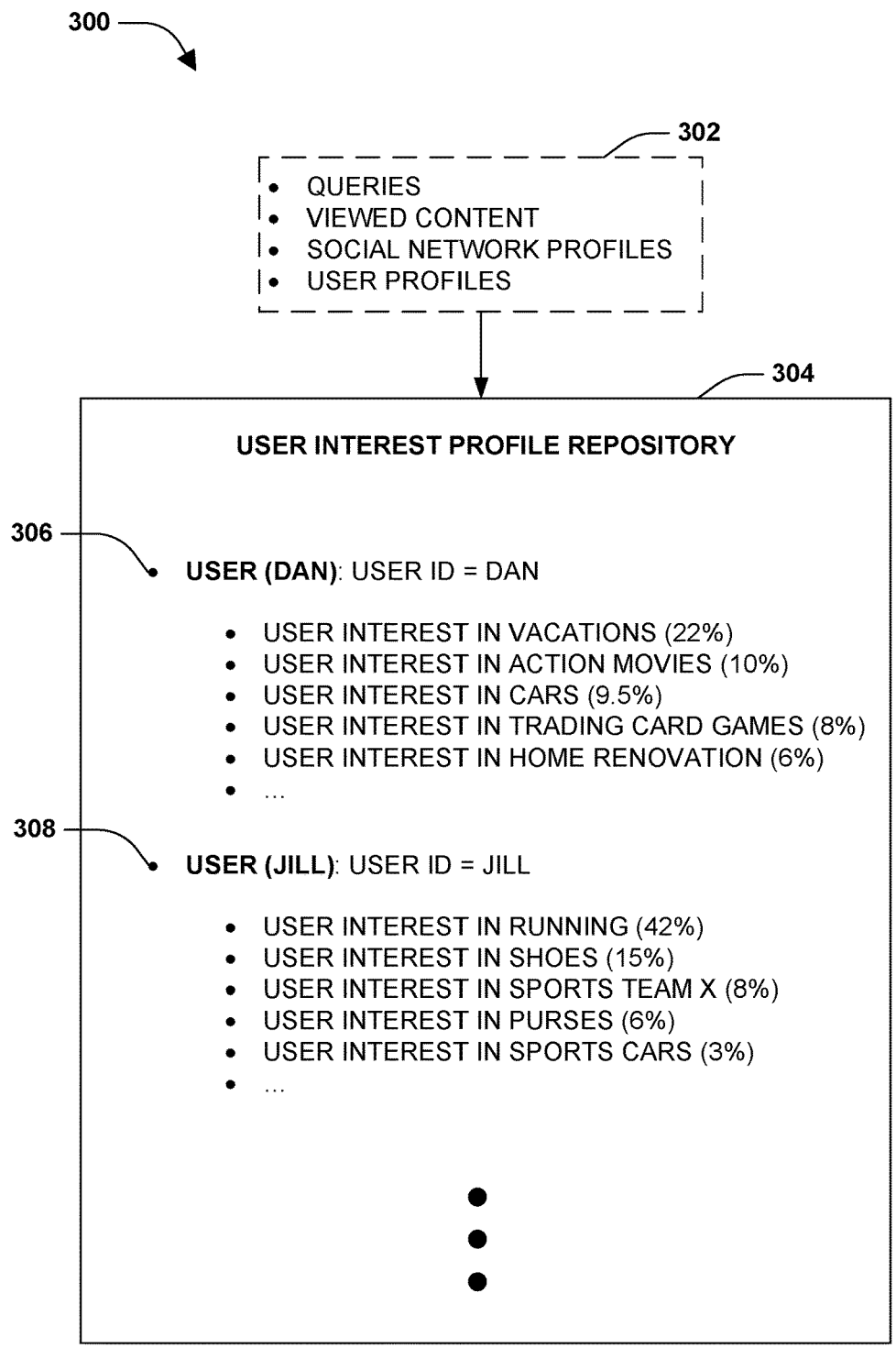
FIG. 3 is an illustration of an example of a user interest profile repository.

At 106, a user interest profile for a user of the client device may be identified based upon the client identifier (e.g., FIG. 3). For example, the user interest profile may comprise a set of user interests for the user and/or interest levels for such user interests (e.g., user Dan may have a 22% interest in vacations, a 10% interest in action movies, etc.). The set of user interests may be derived from queries executed by the user, content visited or accessed by the user, a social network profile for the user, a user profile maintained by a service for the user (e.g., a cloud service, an operating system, a garden club website, etc.), etc. In this way, one or more user interests for the user may be identified.

At 108, related content for the website may be identified based upon the website identifier and/or based upon the related content comprising one or more topics corresponding to one or more user interests specified within the user interest profile above an interest threshold. The related content may comprise content provided by the website (e.g., a news website may provide vacation images, articles, videos, and/or other content identifiable based upon the website identifier) and/or from external web sources that are external to the website (e.g., a second website, a social network, an advertisement service, etc.).

Figure 4:
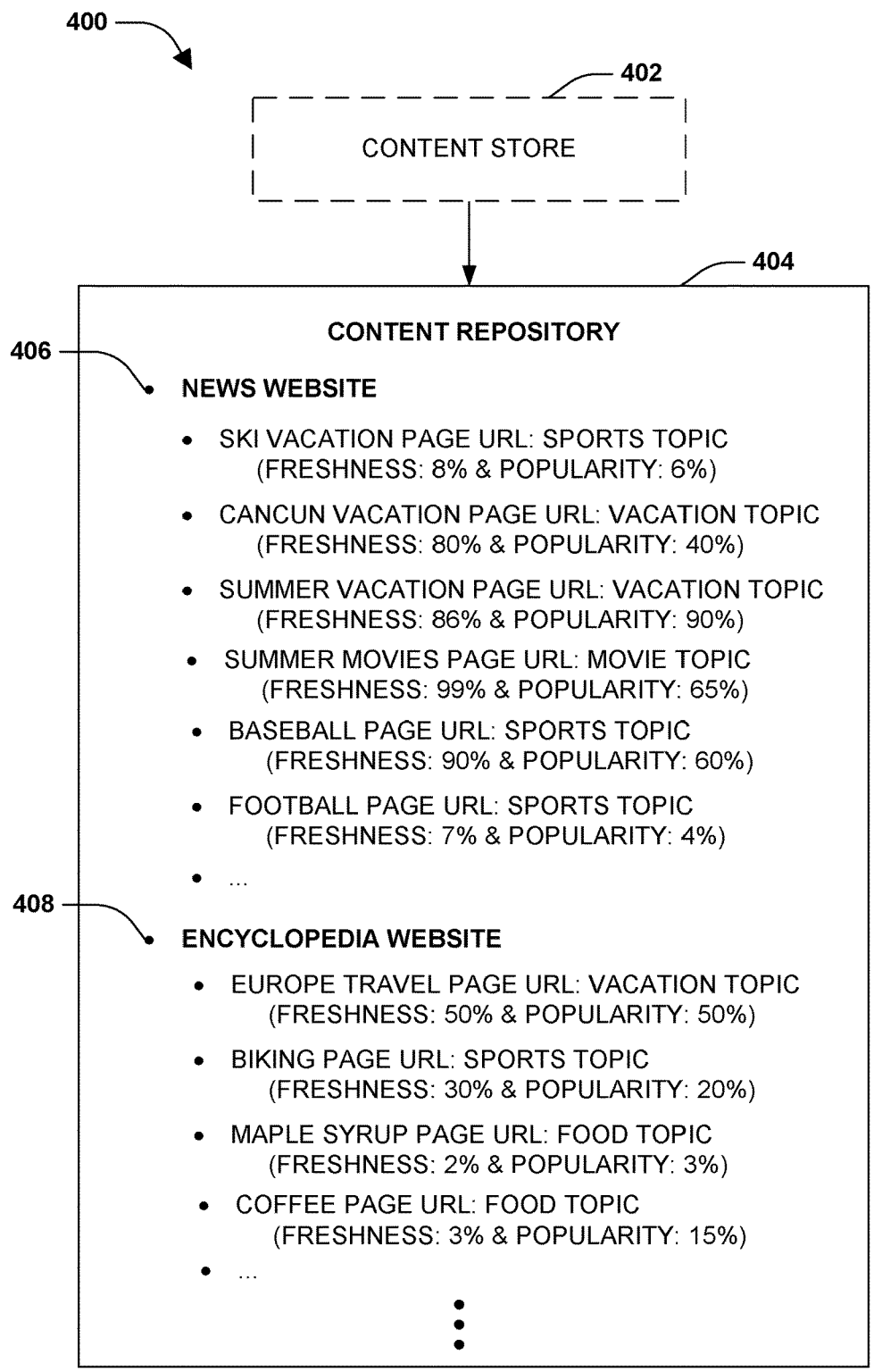
FIG. 4 is an illustration of an example of a content repository.

In an example of identifying related content, a content repository comprising content references to content provided by one or more web sources may be maintained (e.g., FIG. 4). Content associated with respective content references may be assigned topics and/or ranked based upon various factors. For example, first content (e.g., a pizza article) referenced by a first content reference may be evaluated to determine one or more topics for the first content (e.g., a pizza topic, a food topic, a business topic, etc.). The one or more topics may be assigned to the first content reference. A first rank may be assigned to the first content reference based upon a freshness factor (e.g., based upon whether the pizza article is relatively fresh/new or old/stale, which may be determined based upon a time elapsed since a publication time, a last accessed time, and/or other metric) and/or a popularity factor (e.g., based upon a number of users who have recently accessed the first content). A set of content references within the content repository may be identified based upon the set of content references being associated with the website identifier (e.g., content provided by the website) and/or based upon the set of content references comprising rankings above a relevancy threshold (e.g., fresh and/or popular content). Content may be identified from the set of content references as the related content based upon the identified content comprising topics corresponding to the one or more user interests of the user. In this way, related content that may be fresh, popular, and/or interesting to the user may be identified.

At 110, one or more related content references may be provided to the client device for display of the related content. In an example, a related content reference may comprise the related content. In another example, a related content reference may comprise a reference, such as a URL, to content provided by the website or an external web source (e.g., a second website, a social network, a news feed, a photo sharing service, etc.). In another example, the client device may be instructed to cache the one or more related content references for subsequent display of the related content (e.g., while browsing the website, while browsing a different website, during a subsequent browsing session, etc.).

The related content, referenced by the one or more related content references, may be displayed through a content recommendation reader interface. For example, the content recommendation reader interface may be provided by the web browser and/or may not be hosted by the website, thus allowing for related content to be displayed for websites that may or may not be capable of identifying and/or displaying related content. In an example, related content (e.g., first related content, second related content, etc.) may be displayed through the content recommendation reader interface according to a magazine layout where a magazine page may comprise one or more portions of related content (e.g., a first page may comprise an arrangement of a pizza delivery article, a truck article, and/or other portions of first related content; a second page may comprise an arrangement of a business news article, a franchise article, a restaurant article, and/or other portions of second related content; etc.). Based upon content navigation input through the content recommendation reader interface (e.g., a gesture such as a finger swipe; user interaction with a "next" user interface element or a "back" user interface element' etc.), the content recommendation reader interface may transition from displaying first related content (e.g., referenced by a first related content reference) to displaying second related content (e.g., referenced by a second related content reference). For example, one or more portions of the second related content (e.g., a third pizza article, a food industry article, and/or other portions of the second related content) may be displayed through a second page of the content recommendation reader interface. To mitigate display of redundant content, a local history of content displayed by the client device may be used to determine whether the second related content has already been displayed. If the second related content has already been displayed, then the content recommendation reader interface may not transition to the second related content, but may transition to a third related content. In this way, the user may view related content through the content recommendation reader interface that may be interesting to the user, as opposed to manually searching for such content through the website or other web sources.

Figure 5A:
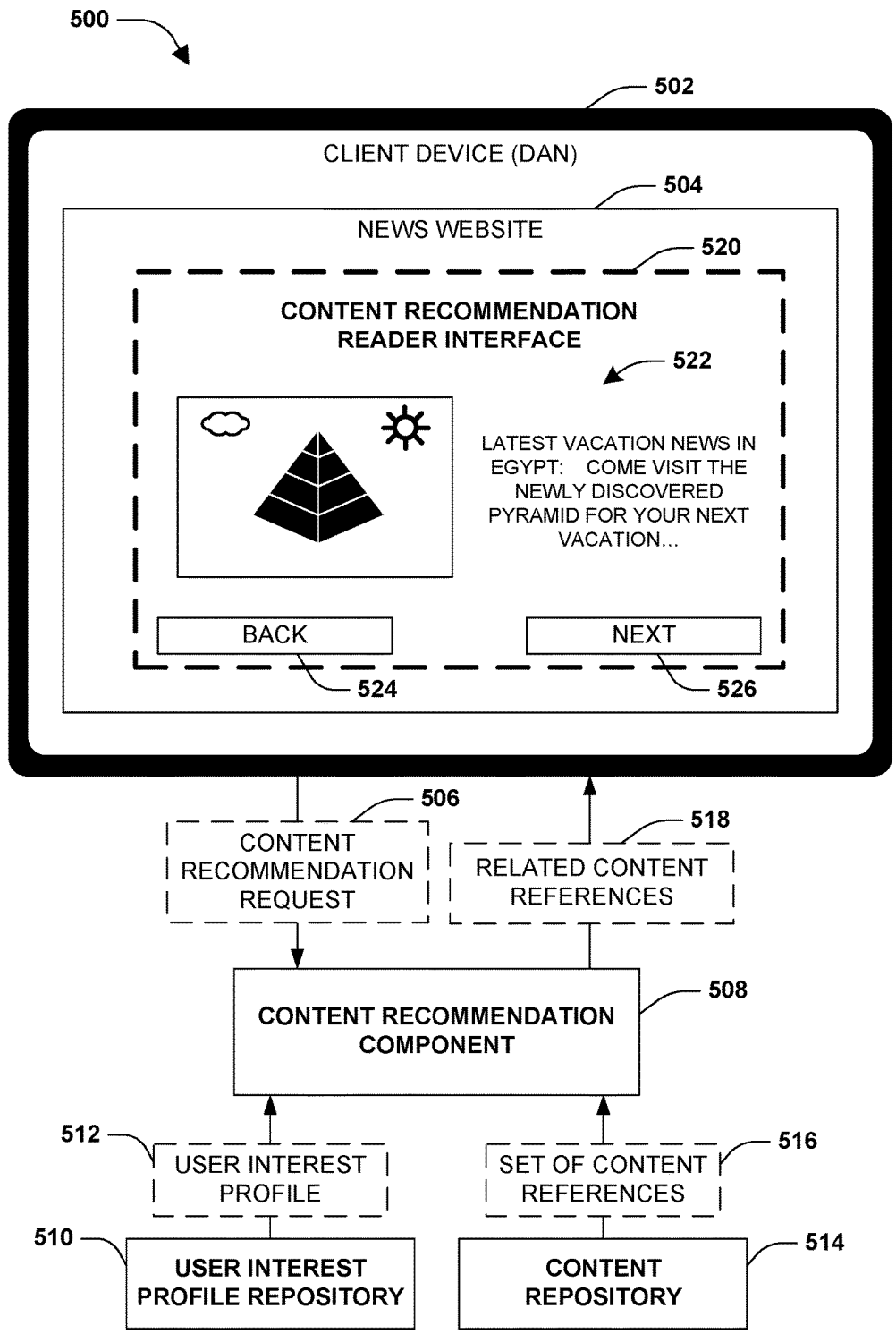
FIG. 5A is a component block diagram illustrating an exemplary system for displaying related content associated with browsing a website.
Figure 6:
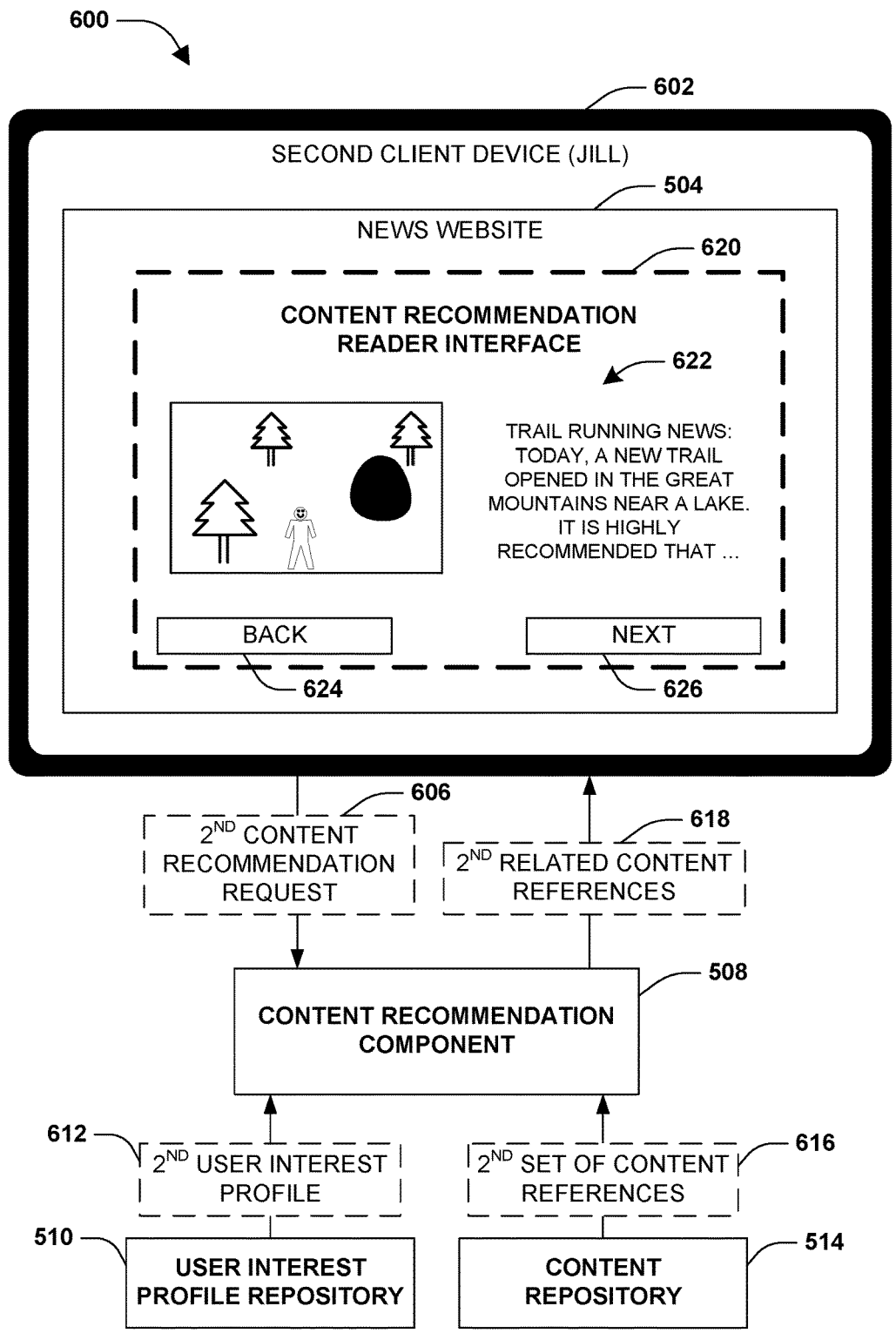
FIG. 6 is a component block diagram illustrating an exemplary system for displaying related content associated with browsing a website.

In an example, different related content may be provided for various users that may visit the website (e.g., FIG. 5A compared with FIG. 6). For example, a second content recommendation request may be received from a second client device accessing the website. The second content recommendation request may specify a second client identifier and the website identifier. A second user interest profile for a second user of the second client device may be identified based upon the second client identifier (e.g., the second user may have different interests than the user of the client device). Second related content for the website may be identified based upon the website identifier and/or based upon the second related content comprising one or more topics corresponding to one or more user interests specified within the second user interest profile (e.g., above some threshold). One or more second related content references, referencing the second related content, may be provided to the second client device for display of the second related content. The second related content may be different than the related content based upon different user interests (e.g., differences between the second user interest profile and the user interest profile). At 112, the method ends.

Figure 2:
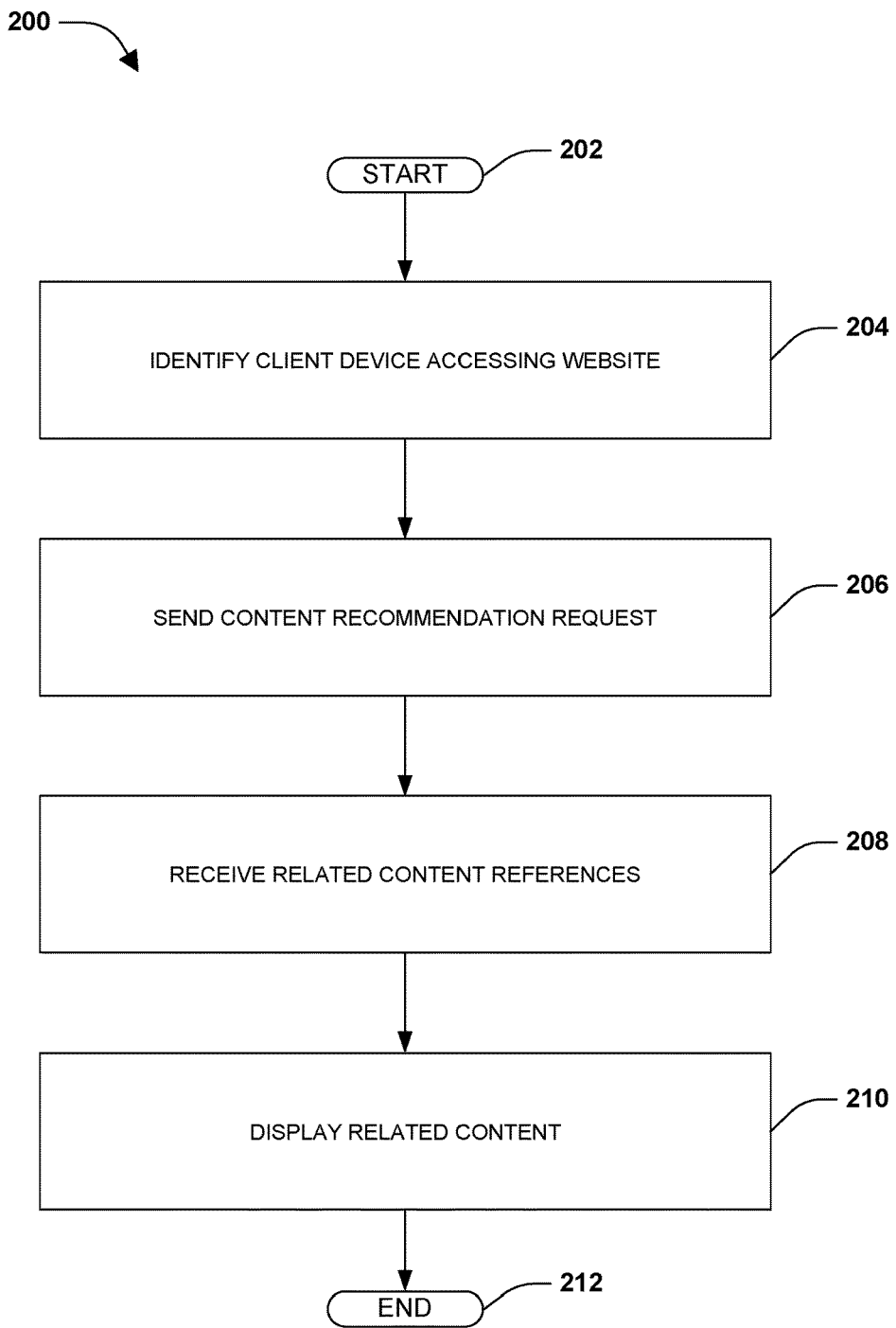
FIG. 2 is a flow diagram illustrating an exemplary method of displaying related content associated with browsing a website.

An embodiment of displaying related content associated with browsing a website is illustrated by an exemplary method 200 of FIG. 2. At 202, the method starts. At 204, a determination may be made as to whether a client device is accessing a website. For example, a web browser may determine that a user has navigated to a website. At 206, a content recommendation request may be sent to a content recommendation component (e.g., associated with a search engine or other entity capable of identifying content provided by one or more web sources such as the website). The content recommendation request may specify a client identifier (e.g., an identifier of the client device or the user) and/or a website identifier (e.g., an identifier of the website, such as a URL). At 208, one or more related content references may be received. The one or more related content references may reference related content corresponding to the website identifier (e.g., web pages, articles, documents, music, and/or other content provided by the website) and/or corresponding to one or more user interests specified by a user interest profile corresponding to the client identifier. At 210, related content, referenced by at least some of the one or more related content references, may be displayed through a content recommendation reader interface. Navigation between portions of the related content may be facilitated based upon content navigation input. In this way, a user may view related content, interesting to the user, through the content recommendation reader interface similar to a magazine reading experience (e.g., the user may view one or more portions of related content per page and/or may navigate back/forth between pages of related content). At 212, the method ends.

FIG. 3 illustrates an example 300 of a user interest profile repository 304. The user interest profile repository 304 may comprise one or more user interest profiles for users, such as a Dan user interest profile 306, a Jill user interest profile 308, and/or other user interest profiles not illustrated. A user interest profile may be derived from various information 302 about a user, such as queries submitted by the user, content viewed by the user, a social network profile of the user, other user profiles (e.g., a user profile with a gardening club, a user profile with a running website, etc.), etc. User interest profiles may be indexed for retrieval based upon client identifiers (e.g., the Dan user interest profile 306 may be indexed based upon a UserId=Dan client identifier). User interest profiles may comprise sets of user interests indicating varying degrees of interest that users may have in various topics. For example, Dan may have a 22% user interest in vacations (e.g., 22% of Dan's browsing activity may relate to vacations), a 10% user interest in action movies (e.g., 10% of Dan's browsing activity may relate to action movies), etc. Jill may have a similar or different set of user interests and/or may have similar or different degrees of interests in such topics (e.g., Jill may not have a user interest in vacations, but may have a 2% interest in action movies). In this way, a user interest profile may be intersected with topics assigned to content provided by one or more web sources, such as a website, to identify related content that may be interesting to the user.

FIG. 4 illustrates an example 400 of a content repository 404. In an example, the content repository 404 may be associated with a content store 402 maintained by a search engine. The content store 402 may comprise a plethora of content that may be provided by various web sources (e.g., web pages, images, videos, URLs, and/or millions of other content or references to content accessible through websites, web services, and/or other web sources). The content repository 404 may comprise content references to content provided by web sources. In an example, a news website identifier 406 for a news website may be associated with a ski vacation page URL for a ski vacation webpage, a Cancun vacation page URL for a Cancun vacation webpage, summer vacation page URL for a summer vacation webpage, and/or other content references to content provided by the news website. In another example, an encyclopedia website identifier 408 for an encyclopedia website may be associated with a Europe travel page URL for a Europe travel webpage, a biking page URL for a biking webpage, a maple syrup page URL for a maple syrup webpage, a coffee page URL for a coffee webpage, and/or other content references to content provided by the encyclopedia website.

Content referenced by content references may be evaluated to determine one or more topics for the content. In an example, content of the ski vacation webpage, referenced by the ski vacation page URL associated with the news website identifier 406, may be evaluated to identify a sports topic that may be assigned to the ski vacation page URL (e.g., images, text, and/or video of the ski vacation webpage may be identified as relating to sports). In another example, content of the Europe travel webpage, referenced by the Europe travel page URL associated with the encyclopedia website identifier 408, may be evaluated to identify a vacation topic that may be assigned to the Europe travel page URL (e.g., images, text, and/or video of the Europe travel webpage may be identified as relating to travel). In this way, one or more topics may be assigned to content references within the content repository 404.

Rankings may be assigned to content references based upon various factors, such as a freshness factor (e.g., a time elapsed since publication of an article) and/or a popularity factor (e.g., a number of users who have recently accessed the article within a threshold period of time). In an example, the ski vacation page URL may be assigned a relatively low rank based upon a freshness factor of 8% and/or a popularity factor of 6% (e.g., the ski vacation page may have been updated months prior during a skiing season and/or a small number of users may have accessed the ski vacation page due to a current summer season). In another example, the Cancun vacation page URL may be assigned a relatively high rank based upon a freshness factor of 80% and/or a popularity factor of 40% (e.g., a Cancun vacation page may have been recently updated and/or accessed by users due to Spring break travel season). In this way, rankings and/or topics may be used to identify related content that may be interesting to a user.

FIG. 5A illustrates an example of a system 500 for displaying related content associated with browsing a website. The system 500 may comprise a content recommendation component 508. The content recommendation component 508 may be configured to receive a content recommendation request 506 associated with a client device 502 (e.g., accessed by Dan) navigating to a news website 504 (e.g., through a web browser of the client device 502). The content recommendation request 506 may specify a client identifier for Dan and/or a website identifier for the news website 504. The content recommendation component 508 may be configured to identify a user interest profile 512 for Dan by querying a user interest profile repository 510 using the client identifier for Dan. The user interest profile 512 may comprise a set of user interests that may be used to identify related content that may be interesting to Dan.

The content recommendation component 508 may be configured to identify related content for the news website 504 that may be interesting to the user (e.g., related content comprising topics corresponding to user interests of the user specified within the user interest profile 512) and/or related to the news website 504 (e.g., related content, corresponding to the website identifier, provided by the news website 504). For example, the content recommendation component 508 may retrieve a set of content references 516 from a content repository 514 based upon the set of content references 516 referencing content corresponding to the website identifier and/or referencing content comprising rankings above a relevancy threshold (e.g., content that may be fresh/recent and/or popular). The content recommendation component 508 may evaluate content from the set of content references 516 to identify related content based upon the identified content comprising topics corresponding to one or more user interests specified by the user interest profile 512 for Dan. For example, the related content may comprise a skiing vacation webpage, a Cancun vacation webpage, a superhero movie review, a car image, and/or other content assigned topics correspond to user interests of Dan (e.g., FIGS. 3 and 4).

The content recommendation component 508 may be configured to provide related content references 518 to the client device 502 for display of the related content (e.g., URLs for the related content). In an example, the related content may be displayed through a content recommendation reader interface 520 (e.g., a user interface hosted by a web browser of the client device 502, as opposed to being hosted by the news website 504). For example, first related content, such as an Egyptian vacation article 522, may be displayed through the content recommendation reader interface 520. In an example, the related content may be displayed according to a magazine reader layout (e.g., one or more portions of the first related content, such as the Egyptian vacation article 522, a Cancun article, and a Paris article, may be arranged within a first magazine page; one or more portions of second related content, such as a swimming article, may be arranged within a second magazine page), such as a side-by-side or other arrangement). In this way, a user may navigate between pages of related content using content navigation input (e.g., Dan may "flip through" pages utilizing a back user interface element 524 to access previously displayed related content and/or a next user interface element 526 to access new related content not yet displayed) (e.g., FIG. 5B).

Figure 5B:
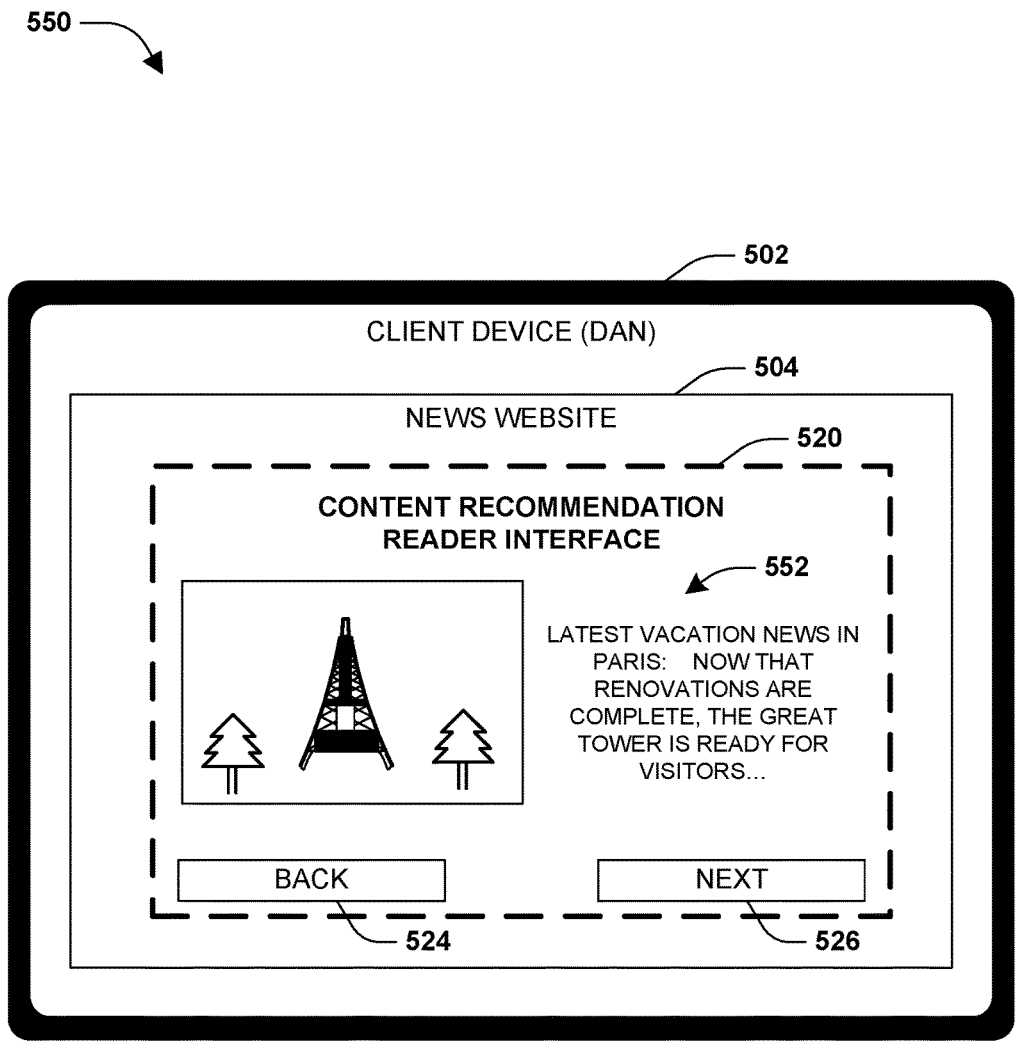
FIG. 5B is an illustration of an example of transitioning a content recommendation reader interface from displaying first related content to second related content based upon content navigation input.

FIG. 5B illustrates an example 550 of transitioning a content recommendation reader interface 520 from displaying first related content to displaying second related content based upon content navigation input. In an example, the content recommendation reader interface 520 may have displayed first related content (e.g., an Egyptian vacation article 522 of FIG. 5A) based upon a client device 502 accessing a news website 504 (e.g., FIG. 5A). A user, such as Dan, may invoke a next user interface element 526 as content navigation input. The content recommendation reader interface 520 may be transitioned from displaying the Egyptian vacation article 522 to displaying second related content such as a Paris vacation article 552 (e.g., based upon the Paris vacation article 552 not being previously displayed, thus mitigating redundant display of related content). In this way, Dan may navigate between related content, through the content recommendation reader interface 520, which may be interesting to Dan.

Figure 5C:
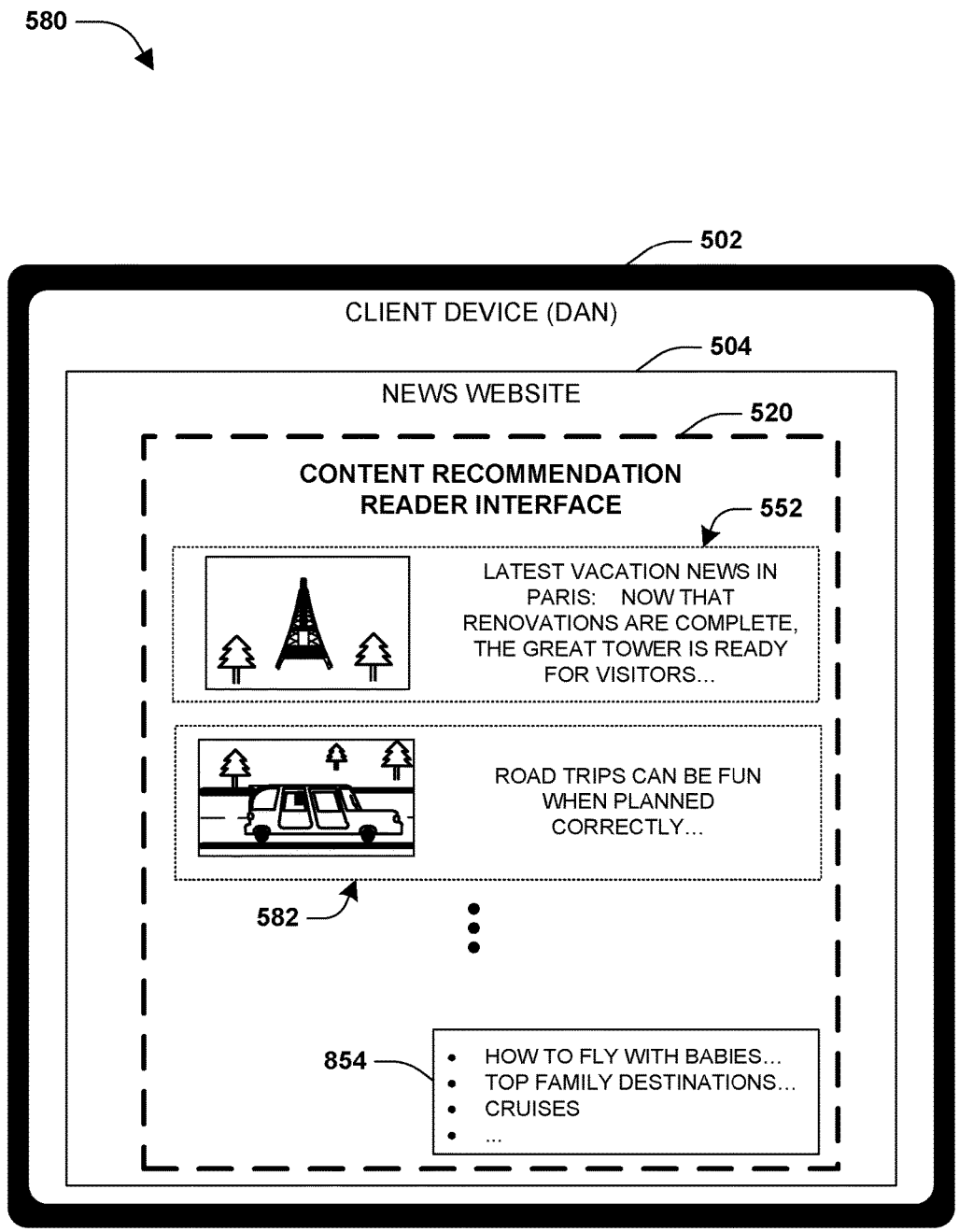
FIG. 5C is an illustration of an example of displaying multiple portions of related content through a content recommendation reader interface.

FIG. 5C illustrates an example 580 of a content recommendation reader interface 520 displaying multiple portions of related content (e.g., based upon a client device 502 navigating to a news website 504). For example, a Paris vacation article 552, a road trip article 582, and/or other portions of related content may be displayed through the content recommendation reader interface 520 (e.g., the user may scroll or navigate through various portions of related content currently displayed by the content recommendation reader interface 520). In an example, a navigation user interface 854 may be provided through the content recommendation reader interface 520. The navigation user interface 854 may specify one or more content navigation elements that may be invoked by a user to access corresponding related content through the content recommendation reader interface 520 (e.g., a how to fly with babies content navigation element for how to fly with babies related content, a top family destinations content navigation element for top family destinations related content, a cruises content navigation element for cruises related content, etc.). For example, responsive to the user invoking the cruises content navigation element, the content recommendation reader interface 520 may be transitioned from the Paris vacation article 552 and the road trip article 582 to the cruises related content (e.g., a cruises article, not illustrated).

FIG. 6 illustrates an example of a system 600 for displaying related content associated with browsing a website. The system 600 may comprise a content recommendation component 508. In one example, the content recommendation component 508 may correspond to the content recommendation component 508 of FIG. 5A. That is, based upon a user, Dan, navigating to a news website 504, the content recommendation component 508 may have identified a user interest profile 512 of Dan used to identify related content that may be interesting to Dan. The content recommendation component 508 may be configured to provide personalized content to various users that may access the news website 504 (e.g., related content for Dan as illustrated by FIGS. 5A and 5B). For example, Jill may utilize a second client device 602 to access the news website 504. The content recommendation component 508 may receive a second content recommendation request 606 specifying a second client identifier for Jill and a website identifier for the news website 504. The content recommendation component 508 may be configured to identify a second user interest profile 612 for Jill by querying a user interest profile repository 510 using the client identifier for Jill. The second user interest profile 612 may comprise a set of user interests that may be used to identify related content that may be interesting to Jill.

The content recommendation component 508 may be configured to identify second related content for the news website 504 that may be interesting to Jill (e.g., second related content comprising topics corresponding to user interests of Jill, as specified within the second user interest profile 612) and/or related to the news website 504 (e.g., second related content, corresponding to the website identifier, provided by the news website 504). For example, the content recommendation component 508 may retrieve a second set of content references 616 from a content repository 514 based upon the second set of content references 616 referencing content corresponding to the website identifier and/or content comprising rankings above a relevancy threshold (e.g., content that may be fresh/recent and/or popular). The content recommendation component 508 may identify content from the second set of content references 616 to identify second related content based upon the identified content comprising topics corresponding to the one or more user interests specified by the second user interest profile 612 for Jill. For example, the second related content may be a running webpage, a shoes webpage, a purses shopping article, and/or other content assigned topics correspond to user interests of Jill (e.g., FIGS. 3 and 4).

The content recommendation component 508 may be configured to provide second related content references 618 to the second client device 602 for display of the second related content (e.g., URLs for the second related content). In an example, the second related content may be displayed through a content recommendation reader interface 620 (e.g., a user interface hosted by a web browser of the client device 602, as opposed to being hosted by the news website 504). For example, second related content, such as a trail running webpage 622, may be displayed through the content recommendation reader interface 620. Jill may navigate between pages of related content using content navigation input (e.g., Jill may "flip through" pages utilizing a back user interface element 624 to access previously displayed related content and/or a next user interface element 626 to access new related content not yet displayed). In this way, related content may be displayed to various visitors of a website based upon interests of such visitors (e.g., Dan may be displayed related content that may differ from related content displayed to Jill).

Figure 7:
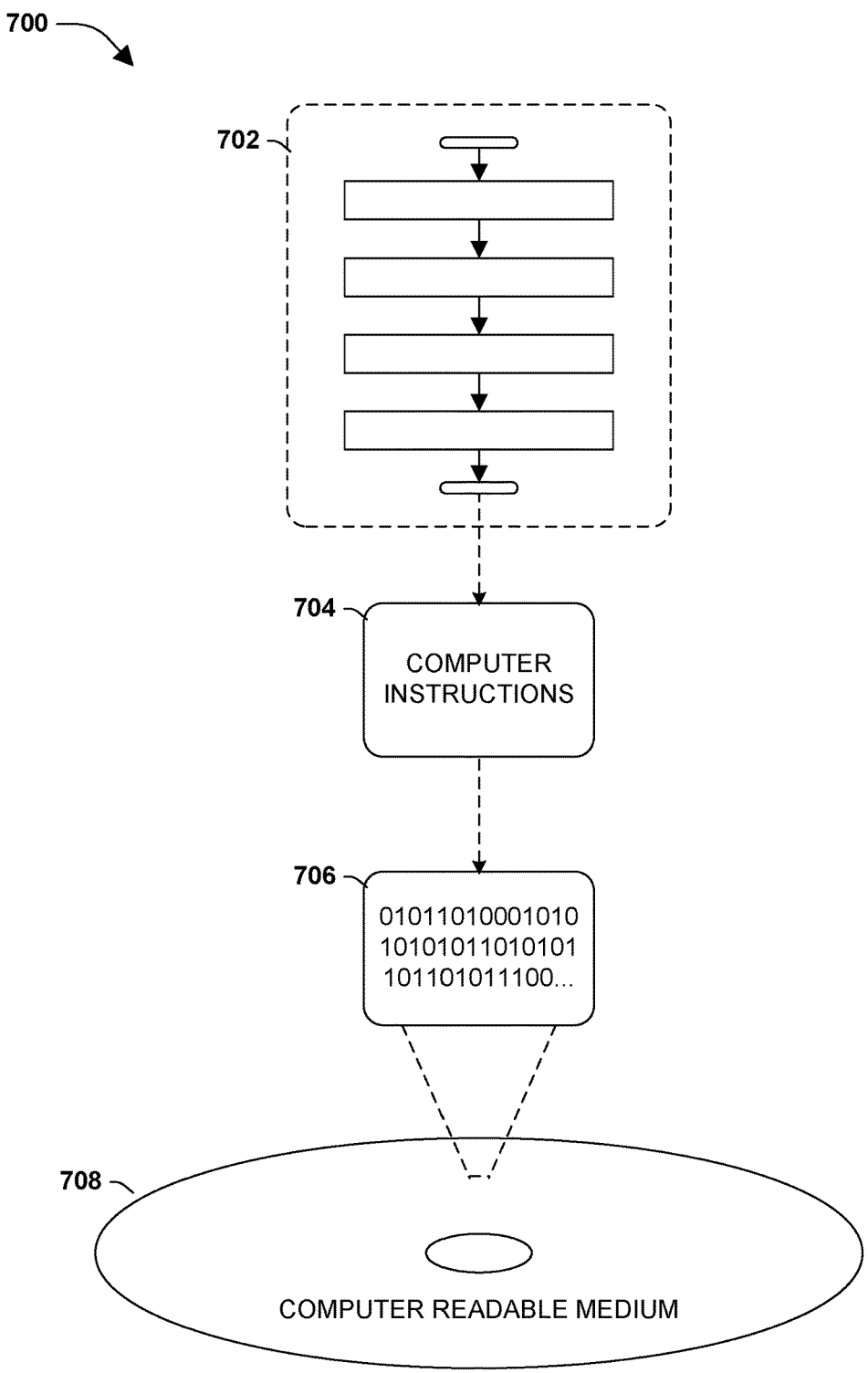
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or at least some of the exemplary method 200 of FIG. 2, for example. In some embodiments, the processor-executable instructions 704 are configured to implement a system, such as at least some of the exemplary system 500 of FIG. 5A and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
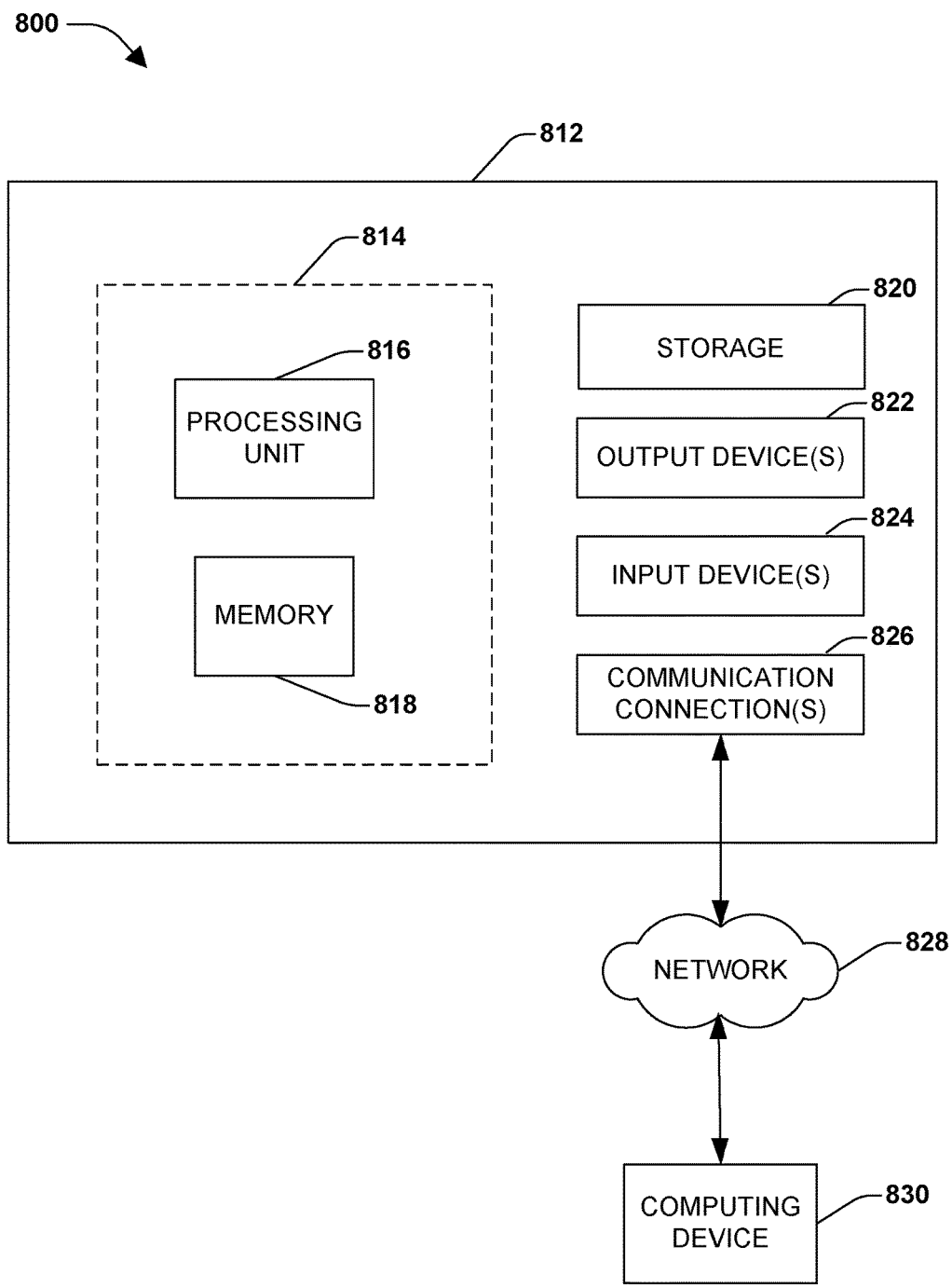
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A system comprising:
    at least one processor; and
    memory coupled to the at least one processor, the memory comprising computer executable instructions that, when executed by the at least one processor, performs a method comprising:
        sending a content recommendation request from a client device accessing a website to a content recommendation component provided by the client device, wherein the content recommendation request specifies a client identifier for a user and a website identifier for the website;
        receiving, from the content recommendation component, one or more content references for the website, wherein the one or more content references are based on the website identifier and relate to one or more topics corresponding to one or more user interests of the user, the one or more topics being specified by a set of user interest data corresponding to the client identifier; and
        displaying the one or more content references.

2. The system of claim 1, wherein a web browser of the client device determines whether the client device is accessing the website.

3. The system of claim 1, wherein the content recommendation component is associated with at least one of the client device and a search utility.

4. The system of claim 1, wherein the set of user interest data specifies the one or more user interests based on at least one of a previously performed query, previously viewed content, and a social network profile.

5. The system of claim 1, the method further comprising, submitting, by the client device, a search query to the website, wherein the search query comprises one or more key words, wherein the one or more keywords relate to the one or more content references.

6. The system of claim 1, wherein the one or more content references comprise at least one of a portion of the content and a reference to the content.

7. The system of claim 1, wherein the one or more user interests specified by the set of user interest data are associated with one or more user interest values.

8. The system of claim 7, wherein the received one or more content references correspond to at least one user interest value that exceeds a relevancy threshold.

9. The system of claim 7, wherein the one or more user interest values are used to rank corresponding interests according to at least one of a newness factor and a popularity factor.

10. The system of claim 1, wherein receiving one or more content references for the website comprises caching the content at the client device for subsequent display.

11. The system of claim 1, wherein receiving one or more content references for the web site comprises:
    evaluating the content recommendation request to determine one or more topics associated with the content recommendation request; and
    using the one or more topics to search a repository comprising the one or more content references.

12. The system of claim 1, wherein displaying the content comprises presenting the content in a content recommendation component interface.

13. The system of claim 12, wherein the content is presented in a magazine reader layout enabling users to navigate between one or more portions of the content.

14. The system of claim 12, wherein a local history of content displayed by the content recommendation component interface may be used to determine whether the content has been previously displayed.

15. The system of claim 14, wherein, when it is determined that the content has been previously displayed, the content recommendation component interface suppresses the content from being subsequently displayed.

16. A method for displaying related content associated with browsing a website, comprising:
    sending a content recommendation request from a client device accessing a website to a content recommendation component provided by the client device, wherein the content recommendation request specifies a client identifier for a user and a website identifier for the web site;
    receiving, from the content recommendation component, one or more content references for the website, wherein the one or more content references are based on the website identifier and relate to one or more topics corresponding to one or more user interests of the user, the one or more topics being specified by a set of user interest data corresponding to the client identifier; and
    displaying the one or more content references.

17. The method of claim 16, wherein a web browser hosts the content recommendation component, and wherein the content recommendation component comprises an interface for displaying the content.

18. The method of claim 16, wherein the content is personalized to a user of the client device using the user interest profile associated with the user.

19. The method of claim 16, wherein the user interest profile comprises one or more topics associated with the one or more user interests, wherein the one or more topics are respectively associated with a user interest value, and wherein receiving one or more content references for the website comprises comparing the user interest value of the one or more topics to a relevancy threshold.

20. A computer readable memory encoding computer executable instructions that, when executed by at least one processor, perform a method for performing real-time attribution modeling and measurement, the method comprising:

sending a content recommendation request from a client device accessing a website to a content recommendation component provided by the client device, wherein the content recommendation request specifies a client identifier for a user and a website identifier for the web site;

receiving, from the content recommendation component, one or more content references for the website, wherein the one or more content references are based on the website identifier and relate to one or more topics corresponding to one or more user interests of the user, the one or more topics being specified by a set of user interest data corresponding to the client identifier; and displaying the one or more content references.

* * * * *